United States Patent
Schmidt et al.

(10) Patent No.: US 10,671,362 B2
(45) Date of Patent: *Jun. 2, 2020

(54) GENERATING CODE FOR FUNCTION CALLS THAT USE MULTIPLE ADDRESSING MODES

(71) Applicant: International Business Machines Corporation, Armonk, NY (US)

(72) Inventors: William J. Schmidt, Rochester, MN (US); Ulrich Weigand, Tuebingen (DE); Alan David Modra, Golden Grove (AU)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/175,985

(22) Filed: Oct. 31, 2018

(65) Prior Publication Data

US 2020/0133647 A1  Apr. 30, 2020

(51) Int. Cl.
*G06F 8/41* (2018.01)

(52) U.S. Cl.
CPC .............. *G06F 8/434* (2013.01); *G06F 8/441* (2013.01); *G06F 8/443* (2013.01)

(58) Field of Classification Search
CPC ........... G06F 8/434; G06F 8/441; G06F 8/443
USPC ........................................................ 717/153
See application file for complete search history.

(56) References Cited

U.S. PATENT DOCUMENTS

| | | | | |
|---|---|---|---|---|
| 5,797,014 A | * | 8/1998 | Gheith | G06F 8/41 717/163 |
| 5,845,118 A | * | 12/1998 | Gheith | G06F 8/443 717/158 |
| 8,719,839 B2 | * | 5/2014 | Yan | G06F 9/547 712/10 |
| 8,756,591 B2 | | 6/2014 | Gschwind et al. | |
| 9,229,695 B2 | | 1/2016 | Gschwind et al. | |
| 2006/0218537 A1 | | 9/2006 | Aroya | |

(Continued)

OTHER PUBLICATIONS

De Sutter et al., "Link-Time Binary Rewriting Techniques for Program Compaction," ACM, 2005, 65pg. (Year: 2005).*

(Continued)

*Primary Examiner* — Ryan D. Coyer
(74) *Attorney, Agent, or Firm* — Martin & Associates, LLC; Derek P. Martin

(57) ABSTRACT

A compiler and linker include multiple addressing mode resolvers that generate code to resolve a plurality of function calls that use different addressing modes. A first addressing mode is defined where a first address for first data is specified as an offset from a base pointer. A second, relative addressing mode is defined where a second address for second data is specified as an offset from an address of an instruction that references the second data. The generated code assures correct operation when functions with different addressing modes are included in the computer program. The generated code preserves a base pointer when executing a function that uses relative addressing, when needed. The compiler inserts one or more relocation markers that trigger certain functions in the linker. A linker resolves the relocation markers inserted by the compiler, and generates code, when needed, that handles a mismatch between addressing modes.

17 Claims, 18 Drawing Sheets

(56) References Cited

U.S. PATENT DOCUMENTS

| | | |
|---|---|---|
| 2009/0217249 A1 | 8/2009 | Kim et al. |
| 2010/0095286 A1 | 4/2010 | Kaplan |
| 2011/0138372 A1 | 6/2011 | Damron |
| 2016/0117201 A1* | 4/2016 | Gschwind ................. G06F 9/54 |
| | | 719/328 |
| 2016/0321045 A1* | 11/2016 | Radigan ................. G06F 8/443 |
| 2018/0113687 A1* | 4/2018 | Gschwind ............... G06F 8/443 |
| 2018/0113723 A1* | 4/2018 | Gschwind ........... G06F 9/44505 |

OTHER PUBLICATIONS

Van Veen et al., "Concurrent Linking with the GNU Gold Linker," University of Amsterdam, 2013, 32pg. (Year: 2013).*
Xu et al., "Improving Address Space Randomization with a Dynamic Offset Randomization Technique," ACM, 2006, 8pg. (Year: 2006).*
Zhang et al., "Control Flow Integrity for COTS Binaries," USENIX, 2013, 17pg. (Year: 2013).*

* cited by examiner

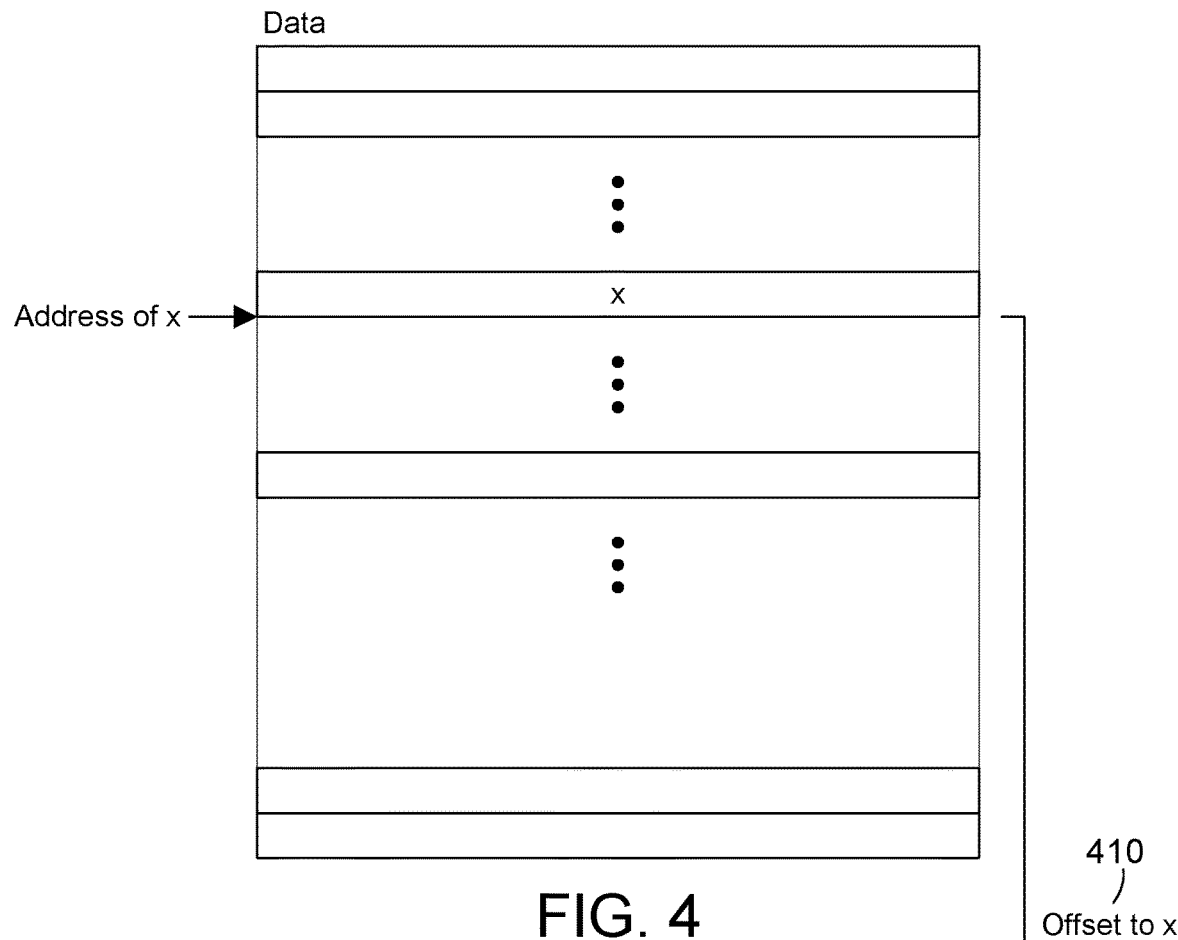

extern int f1 (int x); —— 1110 int f2() #TOC-based addressing —— 1120
{
　　...
　　a = f1(b);　—— 1130
　　...
} int f3() #PC-relative addressing —— 1140
{
　　...
　　a = f1(b);　—— 1150
　　...
}

FIG. 11

```
#PC-relative addressing
int g1 (int x)                — 1210
    {
     ...
    }

#TOC-based addressing
int g2 (int x)                — 1220
    }
     ...
    {
int g3()                      — 1230
    {
     ...
     a = g2(b);               — 1240
     ...
    }
static int g4()               — 1250
    {
     ...
     a = g1(b);               — 1260
     ...
    }
static int g5()               — 1270
    {
     ...
     a = g2(b);               — 1280
     ...
    } int g6()                      — 1290
    {
     ...
     a = g4();                — 1292
     ...
    }
```

FIG. 12

```
#PC-relative addressing
int g7 ()                    —— 1310
{
    •••
    a = g1(b);               —— 1320
    •••
}
int g8()                     —— 1330
{
    •••
    a = g2(b);               —— 1340
    •••
}
```

FIG. 13

```
        .global f2
        .type f2,@function
f2:
        addis 2,12,.TOC.-f2@ha
        addi  2,2,.TOC.-f2@l
        .localentry f2,.-f2
                •
                •
                •
        bl 0 #R_PPC64_REL24 f1   —— 1410
        nop                      —— 1420
                •
                •
                •
```

FIG. 14

```
            .global f3
            .type f3,@function
    f3:
              •
              •
              •
            bl 0 #R_PPC64_REL24_NOTOC f1    — 1510
              •
              •
              •
```

FIG. 15

```
            .global g1
            .type g1,@function
    g1:
              •
              •
              •
            .global g2
            .type g2,@function
    g2:
            addis 2,12,.TOC.-g2@ha
            addi  2,2,.TOC.-g2@l
            .localentry g2,.-g2
              •
              •
              •
```

FIG. 16

```
        .global g3
        .type g3,@function
g3:
        addis 2,12,.TOC.-g3@ha
        addi  2,2,.TOC.-g3@l
        .localentry g3,.-g3
            ⋮ bl 0 #R_PPC64_REL24 g2+8    —— 1710
            ⋮
```

FIG. 17

```
        .type g4,@function
g4:
            ⋮ std r2,24(rl)
        bl 0   #R_PPC64_REL24_NOTOC g1   —— 1810
        ld r2,24(rl)
            ⋮
```

FIG. 18

```
        .type g5,@function
g5:
            ⋮ bl 0   #R_PPC64_REL24 g2+8        —— 1910
            ⋮
```

FIG. 19

```
        .global g6
        .type g6,@function
g6:
        addis 2,12,.TOC.-g6@ha
        addi  2,2,.TOC.-g6@l
        .localentry g6,.-g6
            ⋮ bl 0 #R_PPC64_REL24 g4      —— 2010
            ⋮
```

FIG. 20

```
        .globl g7
        .type g7,@function
g7:
            ⋮ bl 0   #R_PPC64_REL24_NOTOC g1  —— 2110
            ⋮
```

FIG. 21

```
        .globl g8
        .type g8,@function
g8:
            ⋮ pla 12, g2@pcrel
        bl 0   #R_PPC64_REL24_NOTOC g2  —— 2210
            ⋮
```

FIG. 22

Disassembly of section .text:
. . .
0000000010000480 <main>:
. . .
100004ec: 01 00 00 48  bl 100004ec   — 2410
            100004ec: R_PPC64_REL24_NOTOC foo_extern
. . .
100005f4:  01 00 00 48  bl 100005f4   — 2420
            100005f4: R_PPC64_REL24_NOTOC foo_notoc
. . .
10000700:  01 00 00 48  bl 10000700   — 2430
            10000700: R_PPC64_REL24_NOTOC foo_toc
. . .
0000000010000800 <foo_notoc>:
. . .
000000001001f240 <foo_toc>:
1001f240:  00 00 4c 3c   addis r2, r12, 0   — 2440
            1001f240: R_PPC64_REL16_HA  .TOC
1001f244:  00 00 42 38   addi r2, r2, 0   — 2450
            1001f244: R_PPC64_REL16_LO .TOC+0x4
. . .

2500

0000000010020000 <plt_call.foo_extern>:
   10020000:  18 00 41 f8  std r2,24(r1)  — 2510
   10020004:  b0 81 82 e9  ld r12,-32416(r2)  — 2520
   10020008:  a6 03 89 7d  mtctr r12  — 2530
   1002000c:  20 04 80 4e  bctr  — 2540

0000000010020000 <plt_call.foo_extern>:
   10020000:  03 00 10 04  pld r12,244312  — 2610
               44 ba 80 e1
   10020008:  a6 03 89 7d  mtctr r12  — 2530
   1002000c:  20 04 80 4e  bctr  — 2540

0000000010020010 <non_pli_call.foo_toc>:
   10020010:  01 10 10 06  plt r12,0x1001f240  — 2710
               40 f2 80 39
   10020018:  a6 03 89 7d  mtctr r12  — 2530
   1002001c:  20 04 80 4e  bctr  — 2540

FIG. 27

Disassembly of section .text:

. . .

0000000010000480 <main>:

. . .

100004ec:   15 fb 01 48   bl 10020000       — 2810

. . .

100005f4:   0d 02 00 48   bl 10000800       — 2820

. . .

10000700:   11 f9 02 48   bl 10020010       — 2830

. . .

0000000010000800 <foo_notoc>:

. . .

000000001001f240 <foo_toc>:

GENERATING CODE FOR FUNCTION CALLS THAT USE MULTIPLE ADDRESSING MODES

BACKGROUND

1. Technical Field

This disclosure generally relates to computer systems, and more specifically relates to generating executable code for computer systems.

2. Background Art

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system.

Different addressing modes may be used in different computer systems. Two commonly-used addressing modes are program counter-relative (PC-relative) addressing, where the location of data for an instruction is specified as an offset from the address of the instruction, and Table of Contents (TOC) addressing, where the location of data is specified as an offset from a base Table of Contents pointer. For computer systems that use a single addressing mode, a compiler typically assures the code it generates conforms to the single addressing mode. However, computer system components are now being combined that have different addressing modes. A compiler and linker are thus needed to support multiple addressing modes in the same computer program.

BRIEF SUMMARY

A compiler and linker include multiple addressing mode resolvers that generate code to resolve a plurality of function calls that use different addressing modes. A first addressing mode is defined where a first address for first data is specified as an offset from a base pointer. A second, relative addressing mode is defined where a second address for second data is specified as an offset from an address of an instruction that references the second data. The generated code assures correct operation when functions with different addressing modes are included in the computer program. The generated code includes code to preserve a base pointer when executing a function that uses relative addressing, when needed. The compiler inserts one or more relocation markers that trigger certain functions in the linker. A linker resolves the relocation markers inserted by the compiler, and generates code, when needed, that handles a mismatch between addressing modes.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 4 is a block diagram graphically illustrating the PC-relative addressing mode;

FIG. 5 is a snippet of pseudo-code that illustrates the PC-relative addressing mode;

FIG. 11 shows a first code snippet used to illustrate function of the compiler;

FIGS. 12 and 13 show a second code snippet used to illustrate function of the compiler;

FIGS. 14-22 show portions of the code generated for the functions in FIGS. 11-13;

FIGS. 25-27 show sample stubs generated by the linker for the text portion in FIG. 24; and FIG. 28 is a sample text portion of the computer program in FIG. 24 after replacing the call-without-relocation markers with calls to the stubs in FIGS. 25-27.

DETAILED DESCRIPTION

Figure 1:
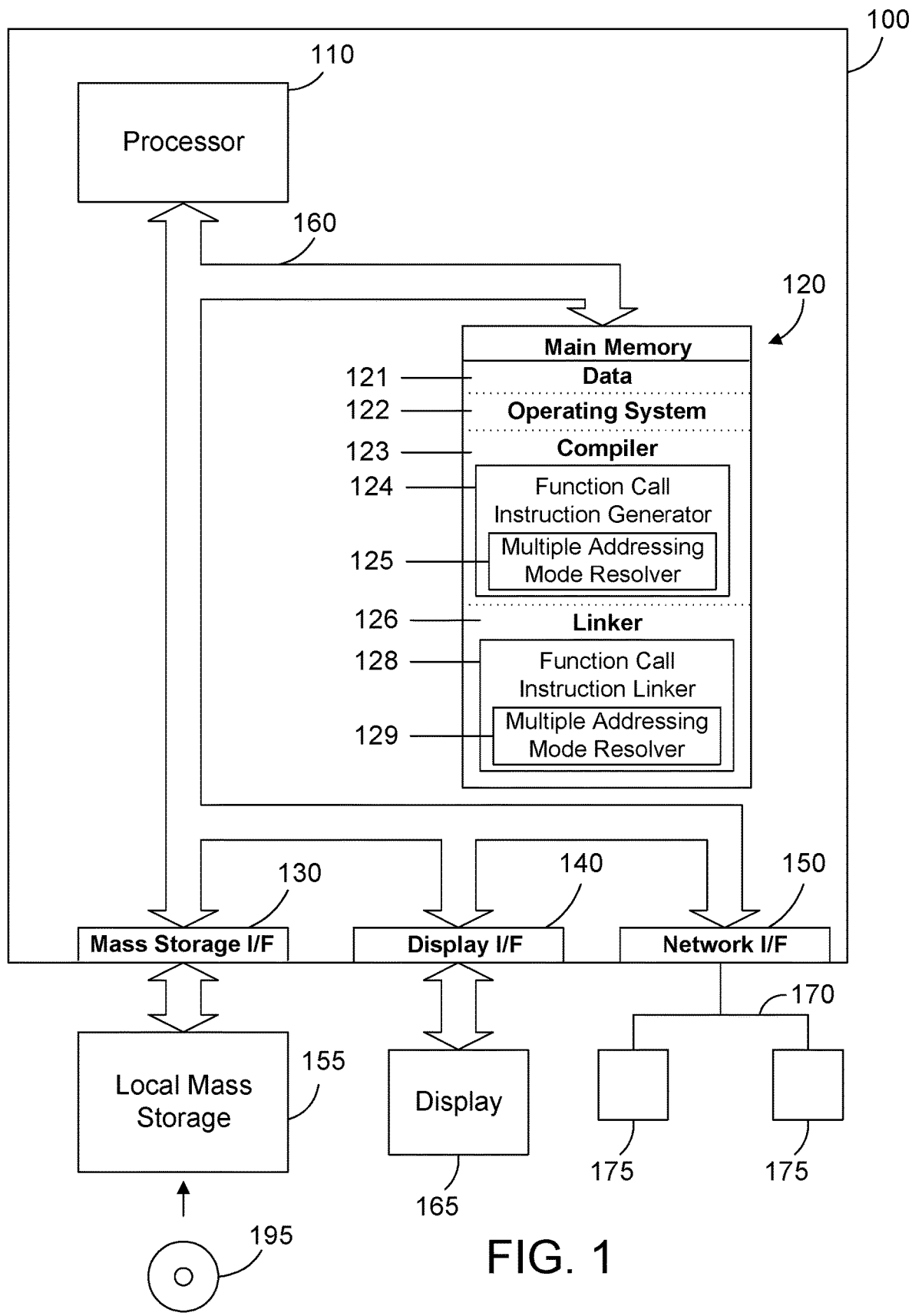
FIG. 1 is a block diagram of a computer system that includes a compiler and linker that support different addressing modes.

All nontrivial computer programs require the ability to address data and code. A computer system will have one or more Application Binary Interfaces (ABIs) defined for it, which consist of agreements about, among other things, how code and data will be laid out in memory, and what instruction sequences can be used to address it. A compiler that conforms with such an ABI will generate compliant instruction sequences to access the code or data. Often the compiler does not know the final address of the code or data, so it generates placeholder addresses along with "relocation" information instead. A linker that conforms with the ABI completes the layout of code and data, and uses the relocation information to fill in the final address information for each such address. For addresses that can't be resolved at compile time, an ABI usually requires at least a base address and an offset. The base address may be defined to be the address of the instruction accessing the data, so that the offset describes the distance from that instruction to the data. This is sometimes referred to as program counter-relative addressing, or "PC-relative addressing." Alternatively, the base address may be found in a machine register that points to a run-time data structure. Two examples of this are a table of contents (TOC) and a global offset table (GOT). In both cases, a fixed anchor point is used to access entries in the table, which contain addresses of the global data. In the case of a TOC, small data may sometimes reside directly in the table without an additional indirection. For efficiency, the base address, or fixed anchor point, is usually stored in a dedicated register throughout a function's execution. Until now, most existing ABIs have only supported either a PC-relative addressing model or a TOC/GOT style addressing model, not both. However, when an existing ABI uses one model, and new hardware that supports that ABI adds capabilities that makes the other model more performant, there is a need to transition from the first model to the second. Because existing library code will have been compiled for the first model, and it may not be possible to recompile that code at will, code using both models must be able to co-exist.

There is one known ABI that supports aspects of both PC-relative and GOT addressing. The default s390 ABI, used with IBM S/390, or "Z series," processors, uses a GOT register that is always saved around calls and is always initialized by a callee. PC-relative addressing instructions were added later, but can always co-exist with GOT addressing. However, such a model incurs the costs of maintaining the GOT register at function calls even if all accesses in the caller and callee are PC-relative. This can be costly in code where functions are small and function calls are frequent.

Thus there is a need for ABI protocols, and compilers and linkers to implement them, to support both PC-relative and TOC/GOT addressing in an efficient manner, such that costs for TOC/GOT addressing are only incurred when they are needed. The disclosure and claims herein are directed to such a compiler.

A compiler and linker include multiple addressing mode resolvers that generate code to resolve a plurality of function calls that use different addressing modes. A first addressing mode is defined where a first address for first data is specified as an offset from a base pointer. A second, relative addressing mode is defined where a second address for second data is specified as an offset from an address of an instruction that references the second data. The generated code assures correct operation when functions with different addressing modes are included in the computer program. The generated code includes code to preserve a base pointer when executing a function that uses relative addressing, when needed. The compiler inserts one or more relocation markers that trigger certain functions in the linker. A linker resolves the relocation markers inserted by the compiler, and generates code, when needed, that handles a mismatch between addressing modes.

Referring to FIG. 1, a computer system 100 is one suitable implementation of a computer system that includes a compiler and linker as described in more detail below. Computer system 100 is an IBM POWER9 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is universal serial bus (USB) that reads a storage device such as a thumb drive.

Main memory 120 preferably contains data 121, an operating system 122, a compiler 123, and a linker 126. Data 121 represents any data that serves as input to or output from any program in computer system 100. Operating system 122 is a multitasking operating system, such as AIX or LINUX. The compiler 123 includes a function call instruction generator 124 that includes a multiple addressing mode resolver 125. The multiple addressing mode resolver 125 generates code that, when executed, supports multiple different addressing modes, such as TOC and PC-relative. The multiple addressing mode resolver 125 generates appropriate code to handle multiple addressing modes, and when a run-time address cannot be determined by the compiler, the multiple addressing mode resolver inserts linker directives that tell the linker to resolve the address when the computer program is linked. The linker 126 includes a function call instruction linker 128 that includes a multiple addressing mode resolver 129. The multiple addressing mode resolver 129 resolves addresses between different modules of a computer program that are linked together by the linker 126, and generates run-time stubs that resolve an address at run-time that cannot be resolved when the computer program is linked. The compiler 123 and linker 126 thus support multiple addressing modes such that these addressing modes can be used as needed in a computer program.

While the compiler 123 and linker 126 are shown separately in main memory 120 in FIG. 1, these can be packaged together in one computer program. In the alternative, these can be separate computer programs. The compiler 123 and linker 126 could reside on different computer systems, with the compiler 123 generating output code that is input into linker 126 to generate the final executable computer program.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, compiler 123 and linker 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the compiler 123 and linker 126.

Although computer system 100 is shown to contain only a single processor and a single system bus, those skilled in the art will appreciate that a compiler and linker as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175 represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For purposes of this disclosure, we will assume that the two addressing models are PC-relative addressing and addressing that uses a table of contents (TOC). The methods are similar if we replace TOC with global offset table (GOT). We will also assume the use of PowerISA 3.1, proposed for a future generation of Power processor hardware, and the 64-bit ELFv2 ABI for the Power Architecture for implementation details. The existing 64-bit ELFv2 ABI supports the TOC-based addressing model. PowerISA 3.1 provides architectural support for the PC-relative addressing model, so the ABI will be updated to allow interaction between the new PC-relative addressing model and the existing TOC-based addressing model. Linux distributions will continue to have older libraries with TOC-based addressing, and new PC-relative code must be able to use those libraries.

Figures 2, 3:
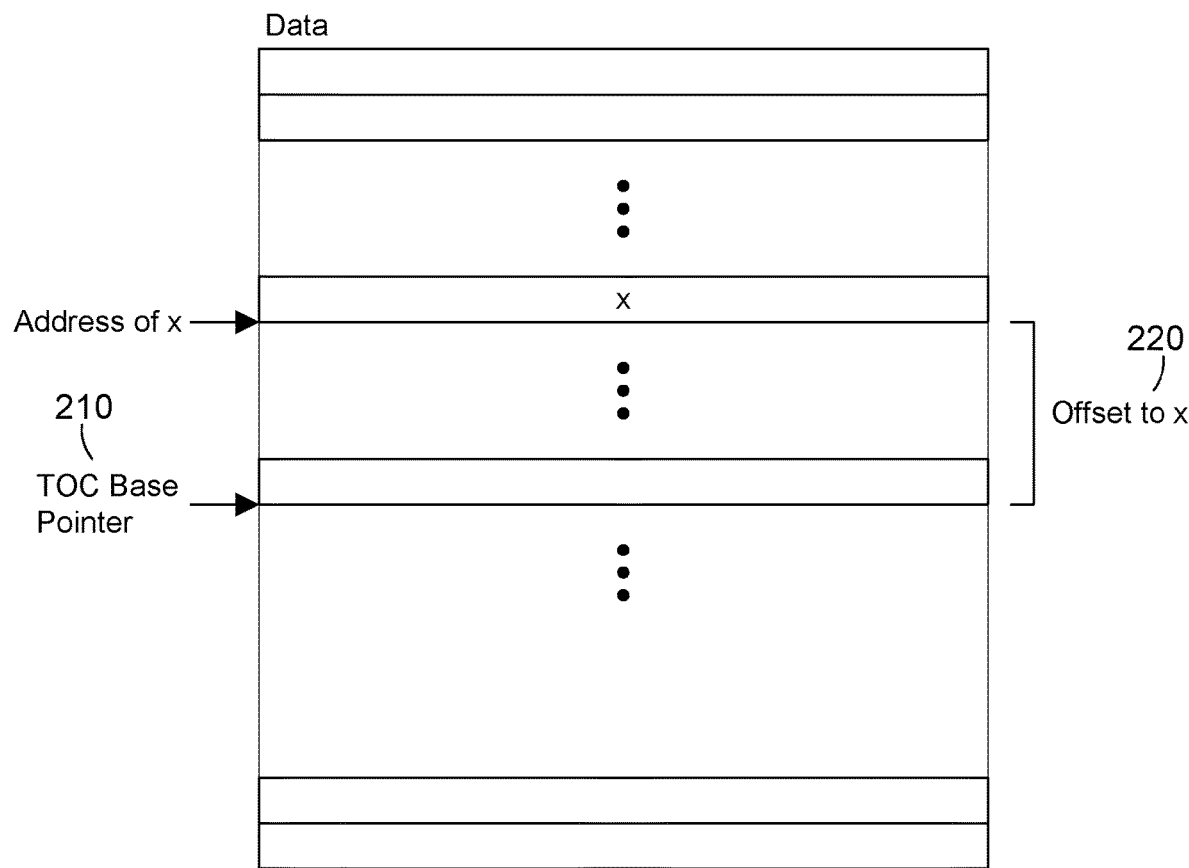
FIG. 2 is a block diagram graphically illustrating the TOC addressing mode.
FIG. 3 is a snippet of pseudo-code that illustrates the TOC addressing mode.

FIGS. 2 and 3 graphically show how TOC-based addressing works. A table of contents (TOC) has a pointer TOC Base Pointer 210 that defines the origin of the TOC. The TOC origin may reside at any point within the TOC, and is often positioned somewhere in the middle so that instructions accessing the TOC can use their full signed addressing range. Data is addressed as an offset relative to the TOC Base Pointer. Thus, to address data x shown in FIG. 2, an offset to x 220 from the TOC Base Pointer is used.

In the TOC-based addressing model, each function is responsible for setting up its own pointer to the TOC in general-purpose register (GPR) r2. Each function has a global entry point, and may also have a local entry point. The local entry point is used when the function is called from within the same statically linked binary unit. The global entry point executes code to set up the TOC pointer, while the local entry point does not, since its local caller is guaranteed to have set up the TOC pointer already. When called via the global entry point, the function may assume that its caller has set GPR r12 to contain the address of the called function. A short code sequence is built by the compiler and linker to initialize r2 based on the TOC base pointer's distance from the function address. FIG. 3 shows two Add instructions 310 and 320 at the global entry point that setup the pointer to the TOC in r2. Two instructions are needed to form a 32-bit offset from r12 to the TOC base pointer, as each instruction can only contain 16 bits of the offset. An instruction that references data x thus specifies an offset from the TOC, as shown in instructions 330 and 340. Again, two instructions are needed to form a 32-bit offset from the TOC base pointer to data x, as each instruction can only contain 16 bits of the offset.

FIGS. 4 and 5 show graphically how PC-relative addressing works. An instruction such as 520 shown in FIG. 5 references data x. The instruction has an address 520, and the data x referenced by the instruction is specified as an offset 410 from the address of the instruction 520.

In the PC-relative addressing model, no TOC pointer is required, so the local and global entry points are the same, and the sequence to initialize r2 does not exist, as shown at 510 in FIG. 5. Furthermore, the compiler is free to use r2 for other purposes. This means that when a TOC-based function calls a PC-relative function, r2 must somehow be saved and restored as part of the calling process, as otherwise when the PC-relative function returns, r2 might no longer contain the TOC pointer.

The ELFv2 ABI already contains a mechanism to record the important characteristics of functions to allow the interactions that we need. A special 3-bit field is included in each function's symbol table entry. This "entry-point field" has the following meanings:

0=The local and global entry points are the same, and the function has a single entry point with no requirement on r12 or r2. On return, r2 will contain the same value as at entry. This value should be used for functions that do not require use of a TOC pointer, but preserve the caller's TOC pointer.

1=The local and global entry points are the same, and r2 should be treated as caller-saved for local and global callers. This value should be used for functions that do not require use of a TOC pointer, and also do not preserve the caller's TOC pointer.

2-6=The local and global entry points are not the same. Different values correspond to how much distance exists between the local and global entry points. r12 must be set to the function address if the function is called via its global entry point, and the global entry point sets up r2 based on r12. If the function is called via its local entry point, r12 is not used and r2 must already contain the TOC pointer.

7=Reserved for future use.

Note that these values do not say anything about the PC-relative addressing model. These designations can all be used on functions employing the TOC-based addressing model. But the field values of 0 and 1 are both useful designations for functions that use PC-relative addressing, depending on whether the function changes the value of r2.

When a call is made to a function that is not visible in the same compilation unit, the compiler cannot resolve the call itself. This is done later, either statically when the linker builds an executable that contains both caller and callee, or dynamically at runtime from a dynamically shared object (DSO). In the former case, the linker resolves the symbol immediately and treats it as a local call. To resolve external calls dynamically, the linker creates a Procedure Linkage Table (PLT) that contains "stub code" to call the function, and modifies the call instruction in the calling function to point to an entry in the PLT corresponding to the call target. The first time the stub code is executed, it calls a dynamic resolver routine to find the address of the intended function and modifies the stub code so that subsequent calls go from the PLT stub directly to that address.

In the prior art, the PLT stub also handles saving the TOC pointer r2 of the caller to a reserved stack slot. The compiler and linker cooperate to restore the TOC pointer as follows. The compiler creates a no-op (nop) after the call statement. Whenever the linker is unable to resolve the callee to a local function, it modifies the nop to contain a load from the reserved stack slot into r2.

The 64-bit PowerPC ELF v2 ABI provides two similar relocation types for use at call sites. Normally, R_PPC64_REL24 is used, requesting the linker to fill in the 24-bit offset to the callee's function address. R_PPC64_REL24_NOTOC can be used instead when the compiler wishes to also convey to the linker that the TOC register may not be valid at the point of the call.

With this background, we can proceed to the actions taken by the compiler for different combinations of the entry-point field values for caller and callee. First, note that the cases where a function using a TOC pointer calls a function that does not use a TOC pointer where the caller has an entry-point field value of 2-6, and the callee has an entry-point field value of 0-1 is prior art, and is referred to herein as "using known methods." The disclosure herein is restricted to cases where the caller has an entry-point field value of 0 or 1. Again, these values can appropriately be used for functions using the PC-relative addressing model, although that is not a requirement.

Case 1: Caller 0, Callee 0-6. It is unusual to have a caller with an entry-point field value of 0, as such a function does not require the use of a TOC pointer itself, but is required to preserve the value of r2 around any calls that it makes. If such a case occurs, however, the compiler will generate a save of r2 to a known stack location prior to each such call, and generate a restore of r2 from the known stack location upon return from each such call. This is true regardless of whether or not the called function is local to the compilation unit.

Case 2: Caller 1, Callee 0-6, External Function Call. When a function that does not use a TOC pointer and does not preserve r2 makes any call to an external function, the compiler generates a call instruction without filling in the target address. The compiler associates a relocation marker of type R_PPC64_REL24_NOTOC with the call site. The compiler can never resolve the address itself.

Case 3: Caller 1, Callee 0-1, Local Function Call. When a function that does not use a TOC pointer and does not preserve r2 makes a local call to a function that does not require a TOC pointer, the compiler generates a direct call to the function's local entry point. If the compiler generates assembly code, it associates a relocation marker of type R_PPC64_REL24_NOTOC with the call site, which may subsequently be resolved either by the assembler or the linker. If the compiler generates object code directly, it may resolve the offset to the callee's local entry point itself with no need for a relocation marker, or it may use the relocation marker and allow the linker to resolve it.

Case 4: Caller 1, Callee 2-6, Local Function Call. When a function that does not use a TOC pointer and does not preserve r2 makes a local call to a function that requires a TOC pointer, the compiler has two options:

(a) The compiler generates a call instruction without filling in the target address. The compiler associates a relocation marker of type R_PPC64_REL24_NOTOC with the call site. Note that the compiler is asking the linker to provide a PLT stub even though this is a local call, since the callee will require r12 to contain its address so that it can create its own TOC pointer.

(b) The compiler generates inline code to set up r12 with the local callee's address, followed by a call instruction without filling in the target address. If the compiler generates assembly code, it associates a relocation marker of type R_PPC64_REL24_NOTOC with the call site, which may subsequently be resolved either by the assembler or the linker. If the compiler generates object code directly, it may resolve the offset to the callee's local entry point itself with no need for a relocation marker, or it may use the relocation marker and allow the linker to resolve it.

Figure 6:
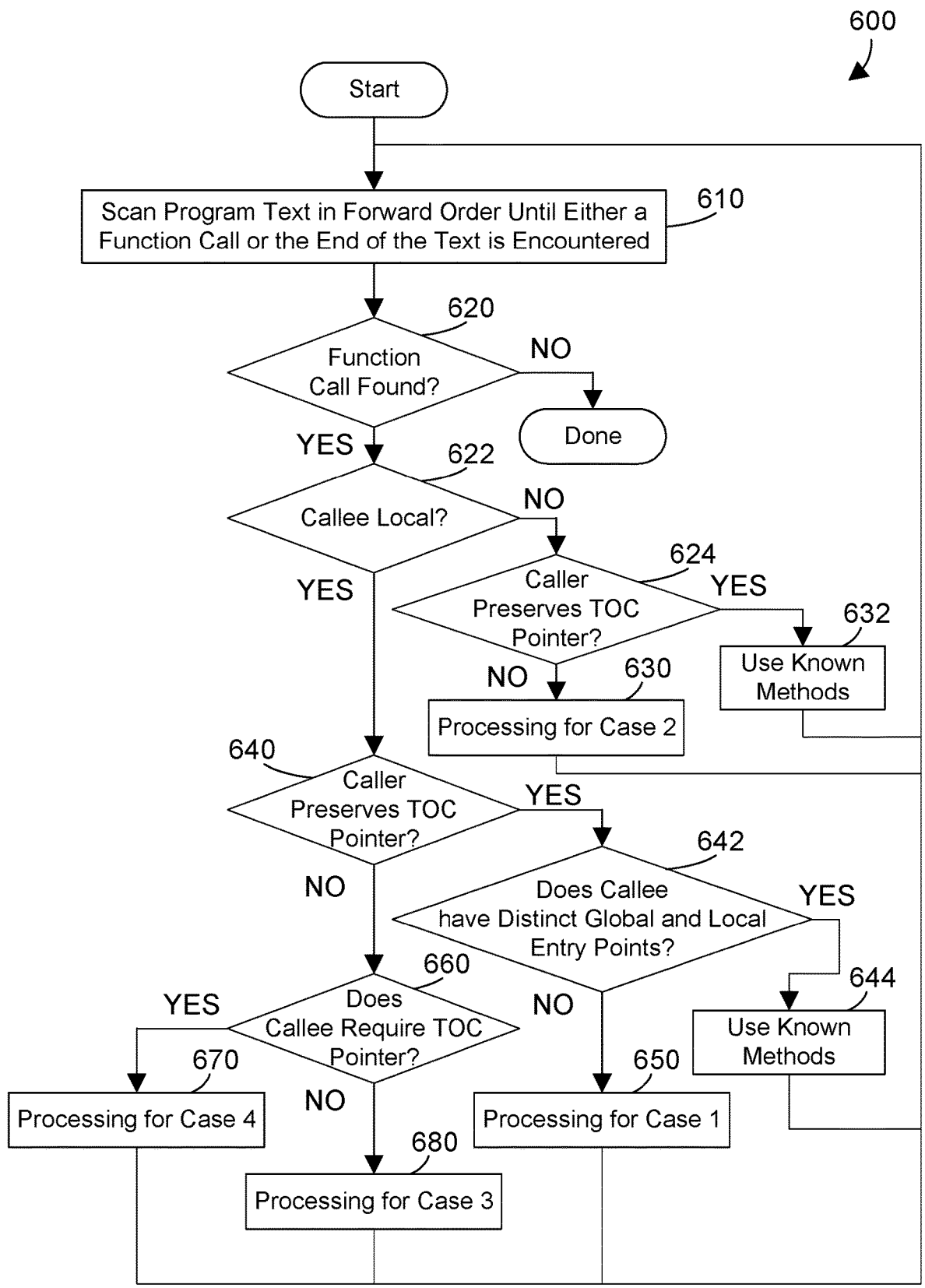
FIG. 6 is a flow diagram of a method for a compiler to generate code for a computer program that includes multiple addressing modes.

FIGS. 6-12 illustrate specific steps that could be used for the four cases shown above. Referring to FIG. 6, a method 600 is preferably performed by the multiple addressing mode resolver 125 in the function call instruction generator 124 in compiler 123 in FIG. 1. The text of a program being compiled is scanned in forward order until either a function call or the end of the text is encountered (step 610). When there is no function call found (step 620=NO), method 600 is done. When a function call is found (step 620=YES), and when the callee is not local (step 622=NO), a determination is made regarding whether the caller function preserves the TOC pointer (step 624). When the caller preserves the TOC pointer (step 624=YES), the compiler uses known methods (step 632). The known compiler methods in step 632 could include, for example, the compiler generating a standard known calling sequence to an unknown function, which the linker will later resolve. When the caller does not preserve the TOC pointer (step 624=NO), processing for Case 2 is performed (step 630). Method 600 then loops back to step 610 and continues. When the callee is local (step 622=YES), a check is made to see if the caller preserves the TOC pointer (step 640). When the caller preserves the TOC pointer (step 640=YES), and the callee has distinct global and local entry points (step 642=YES), known compiler methods are used (step 644), and method 600 loops back to step 610 and continues. When the caller preserves the TOC pointer (step 640=YES) but the callee does not have distinct global and local entry points (step 642=NO), processing for Case 1 is performed (step 650). Method 600 then loops back to step 610 and continues. When the caller does not preserve the TOC pointer (step 640=NO), and the callee requires a TOC pointer (step 660=YES), processing for Case 4 is performed (step 670), and method 600 loops back to step 610 and continues. When the callee does not require the TOC pointer (step 660=NO), processing for Case 3 is performed (step 680), and method 600 loops back to step 610 and continues.

Figure 7:
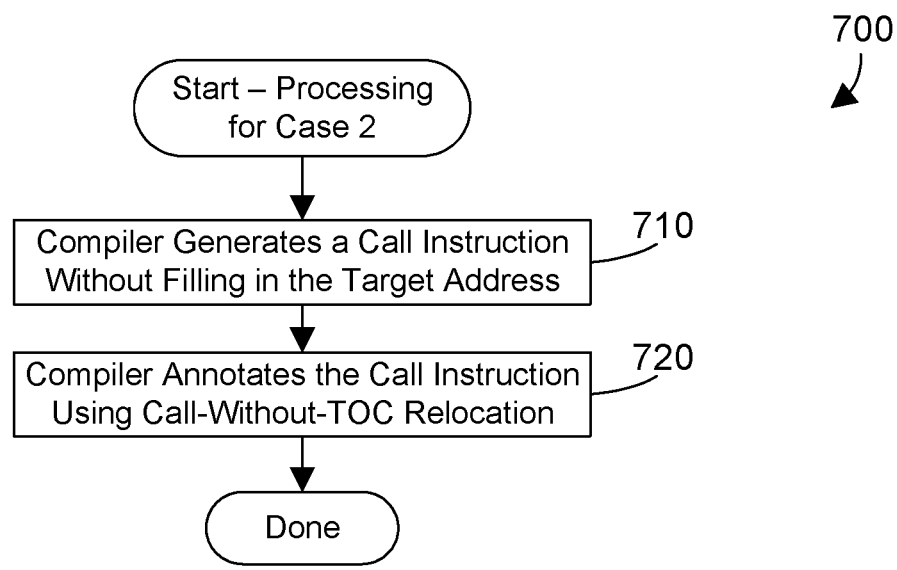
FIG. 7 is a flow diagram of an example method for a compiler to perform processing for Case 2 in FIG. 6.

FIGS. 7-10 shows specific possible methods for performing the processing for each of the four cases in accordance with embodiments herein. Referring to FIG. 7, a method 700 starts when processing for Case 2 is needed, such as when step 630 is encountered in method 600 in FIG. 6. Method 700 is thus one suitable implementation of step 630 in FIG. 6. The compiler generates a call instruction without filling in the target address (step 710), and annotates the call instruction using call-without-TOC relocation (step 720), such as using a R_PPC64_REL24_NOTOC relocation marker. The annotation in step 720 is preferably a special marker, such as R_PPC64_REL24_NOTOC, used by the compiler to tell the linker to resolve the address, if possible, or to generate code that will resolve the address at run-time.

Figure 8:
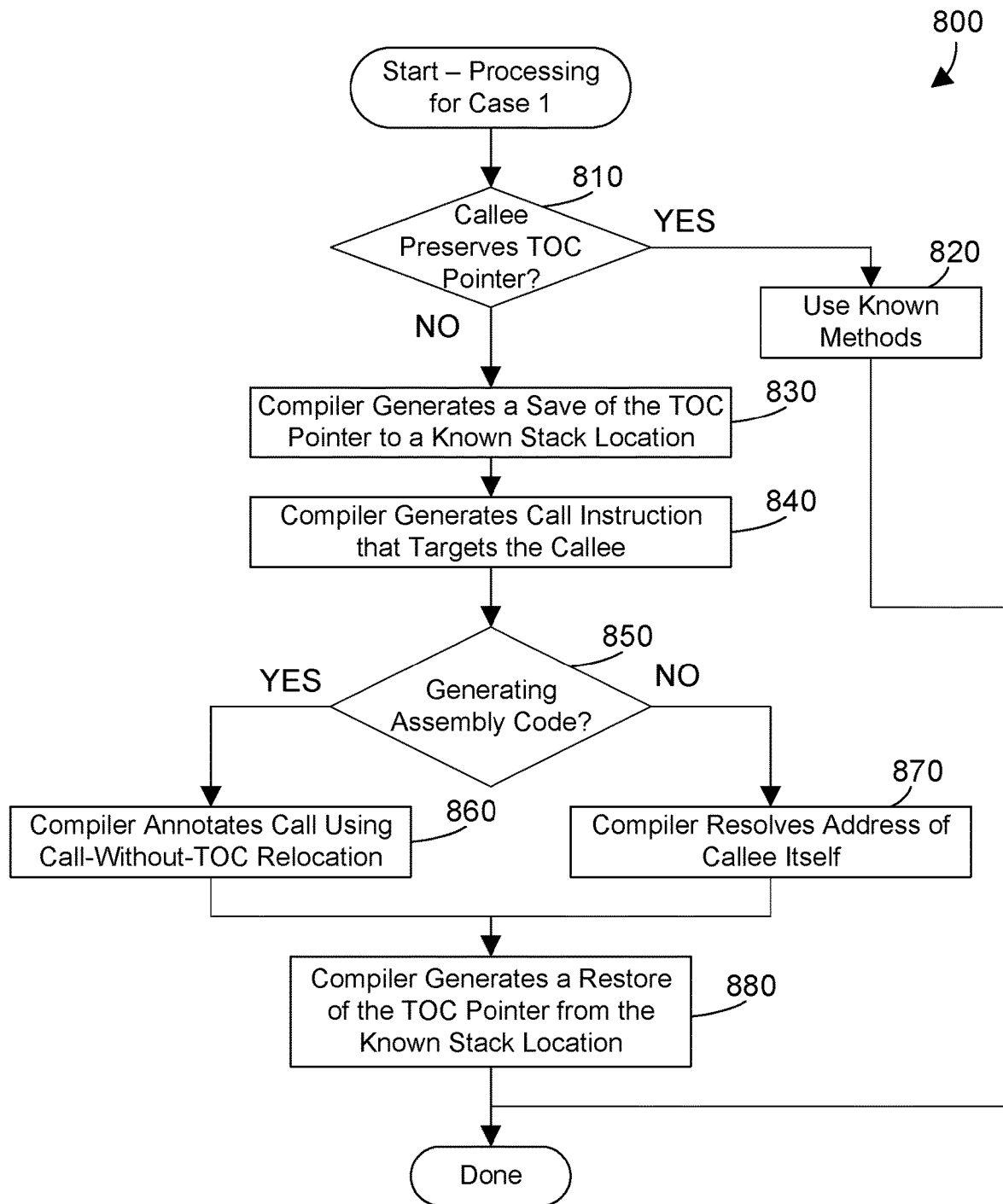
FIG. 8 is a flow diagram of an example method for a compiler to perform processing for Case 1 in FIG. 6.

Referring to FIG. 8, a method 800 starts when processing for Case 1 is needed, such as when step 650 is encountered in method 600 in FIG. 6. Method 800 is thus one suitable implementation of step 650 in FIG. 6. When the callee preserves the TOC pointer (step 810=YES), known methods are used (step 820), and method 800 is done. When the callee does not preserve the TOC pointer (step 810=NO), the compiler generates a save of the TOC pointer to a known stack location (step 830), and generates a call instruction that targets the callee (step 840). When the compiler is generating assembly code (step 850=YES) the compiler annotates the call using call-without-TOC relocation (step 860), such as using a R_PPC64_REL24_NOTOC relocation marker. The compiler then generates a restore of the TOC pointer from the known stack location (step 880). Method 800 is then done. When the compiler is not generating assembly code (step 850=NO), the compiler resolves the address of the callee itself (step 870), then generates the restore of the TOC pointer from the known stack location (step 880). Method 800 is then done.

Figure 9:
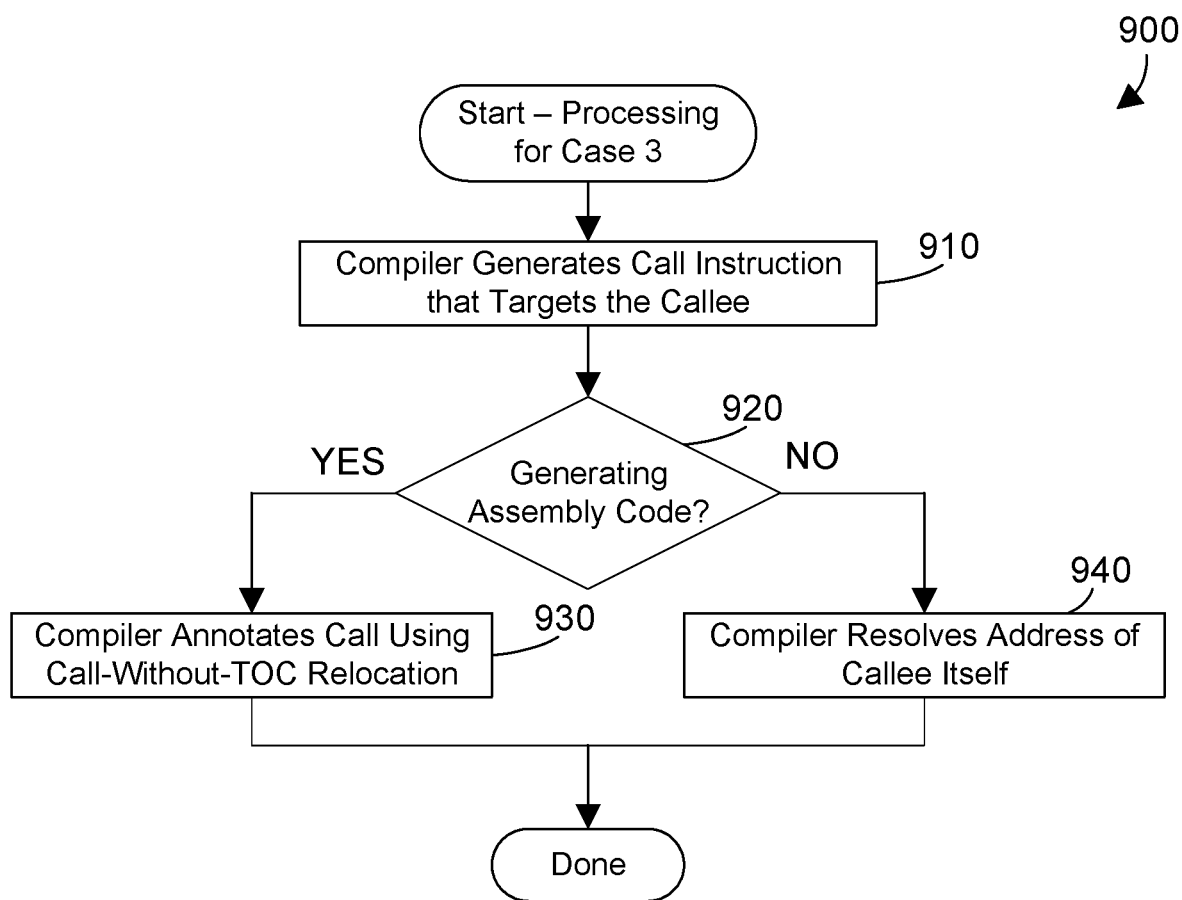
FIG. 9 is a flow diagram of an example method for a compiler to perform processing for Case 3 in FIG. 6.

Referring to FIG. 9, a method 900 starts when processing for Case 3 is needed, such as when step 680 is encountered in method 600 in FIG. 6. Method 900 is thus one suitable implementation of step 680 in FIG. 6. The compiler generates a call instruction that targets the callee (step 910). When generating assembly code (step 920=YES), the compiler annotates the call using call-without-TOC relocation (step 930), such as using a R_PPC64_REL24_NOTOC relocation marker, and method 900 is done. When not generating assembly code (step 920=NO), the compiler resolves the address of the callee itself (step 940), and method 900 is then done.

Figure 10:
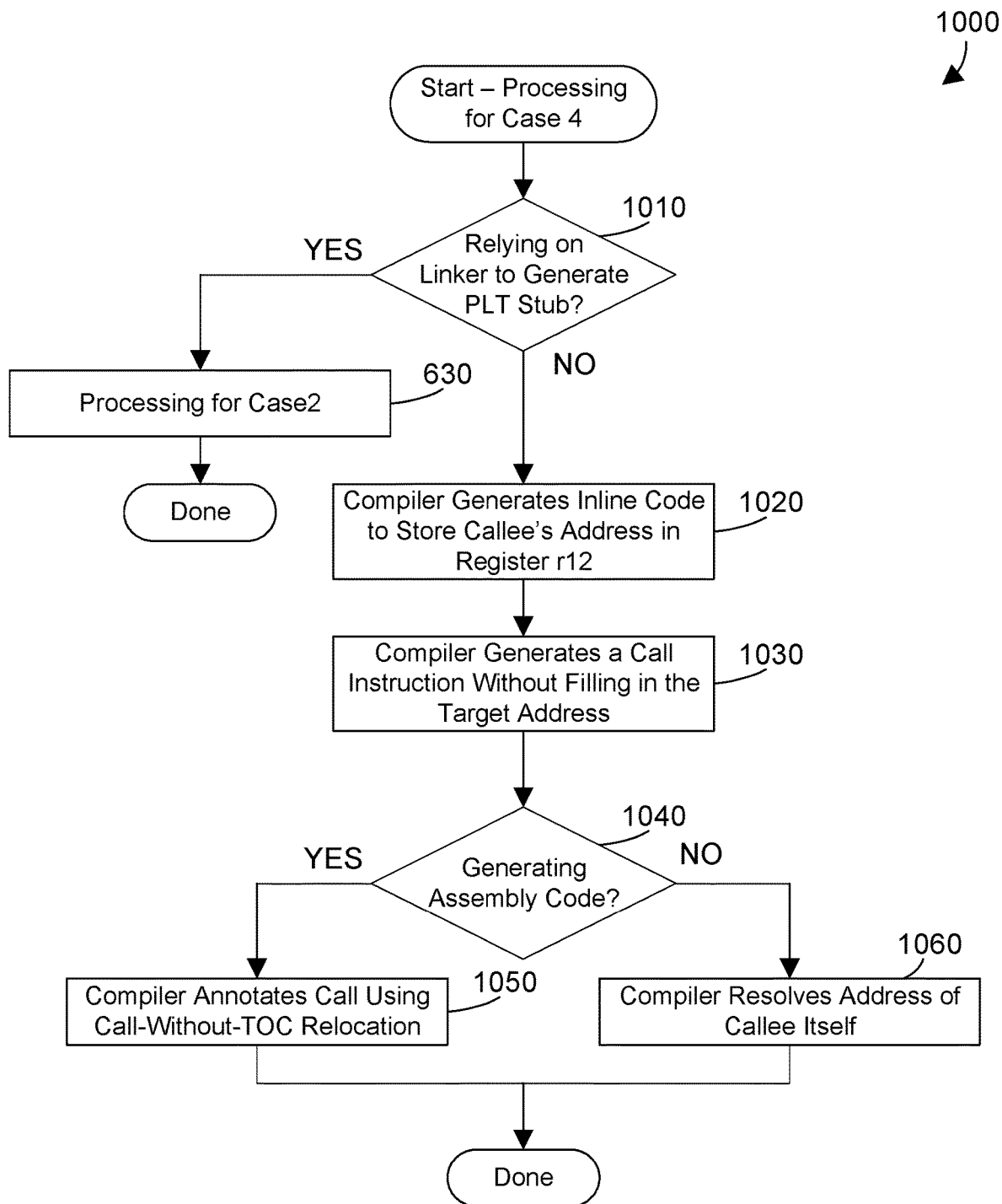
FIG. 10 is a flow diagram of an example method for a compiler to perform processing for Case 4 in FIG. 6.

Referring to FIG. 10, a method 1000 starts when processing for Case 4 is needed, such as when step 670 is encountered in method 600 in FIG. 6. Method 1000 is thus one suitable implementation of step 670 in FIG. 6. When the compiler is relying on the linker to generate a Procedure Linkage Table (PLT) stub (step 1010=YES), processing for Case 2 is performed (step 630). Method 1000 is then done. When the compiler is not relying on the linker to generate a PLT stub (step 1010=NO), the compiler generates inline code to place the callee's address in register r12 (step 1020). The compiler generates a call instruction without filling in the target address (step 1030). When assembly code is being generated (step 1040=YES), the compiler annotates the call using call-without-TOC relocation (step 1050), such as using a R_PPC64_REL24_NOTOC relocation marker, and method 1000 is done. When assembly code is not being generated (step 1040=NO), the compiler resolves the address of the callee itself (step 1060), and method 1000 is done.

The snippets of pseudo-code in FIGS. 11-13 will help illustrate some of the processing in FIGS. 6-10. FIG. 11 shows an external function f1( ) at 1110, which means the function f1( ) is defined outside the binary unit being compiled. Two functions f2( ) at 1120 and f3( ) at 1140 are defined. We assume for this example function f2( ) uses TOC-based addressing while function f3( ) uses PC-relative addressing. Function f2( ) includes a call to function f1( ) at 1130, which makes function f2( ) the caller function and f1( ) the callee function at 1130. Function f3( ) includes a call to function f1( ) at 1150, which makes function f3( ) the caller function and f1( ) the callee function at 1150. Referring to FIG. 6, the program text is scanned in forward order in step 610 until the function call at 1130 in FIG. 11 is found (step 620=YES). The callee function f1( ) is not local because it is an external function, so step 622=NO. Because the caller function f2( ) uses TOC-based addressing, the caller function f2( ) preserves the TOC pointer (step 624=YES). The compiler uses known methods (step 632), such as generating a call instruction without filling in the callee, using the R_PPC64_REL24 relocation marker, as shown at 1410 in FIG. 14, followed by a nop instruction at 1420 that will be overwritten by the linker with a TOC restore instruction, if needed.

Next, method 600 loops back to step 610, which scans the program until the next function call at 1150 is found (step 620=YES). The callee function f1( ) is not local (step 622=NO). Since the caller used PC-relative addressing, it does not preserve the TOC pointer (step 624=NO), so processing for Case 2 is performed (step 630), one suitable example of which is shown in method 700 in FIG. 7. The compiler generates a call instruction without filling in the target address (step 710), and annotates the call instruction using call-without-TOC relocation (step 720), such as using a R_PPC64_REL24_NOTOC relocation marker. An example of this is shown at instruction 1510 in FIG. 15. Method 700 is then done, which means the processing for Case 2 at 630 is done. Method 600 then loops back to step 610, which encounters the end of the text without finding any more function calls (step 620=NO), so method 600 is done.

Next we consider the code in FIGS. 12 and 13. Note that some of the functions in FIG. 12 are marked as "static". This means that the functions can only be called by another function in the same compilation unit. For such a function with TOC addressing, if it can be proven that the function is only called by other functions using TOC addressing, then there is no need for a separate global entry point to set up the TOC, since the TOC will have been established by the time the function is called. Thus, such a function does not have distinct global and local entry points. We assume this is the case for functions marked "static" in FIG. 12.

A function g1( ) is defined at 1210, which we assume for this example uses PC-relative addressing. Function g2( ) is defined at 1220, g3( ) is defined at 1230, g4( ) is defined at 1250, g5( ) is defined at 1270, and g6( ) is defined at 1290, all of which we assume use TOC-based addressing. Function g7( ) is defined at 1310 in FIG. 13, and function g8( ) is defined at 1330, both of which we assume use PC-relative addressing. Suitable examples for g1( ) and g2( ) are shown in FIG. 16. Function g3( ) in FIG. 12 includes a call to function g2( ) at 1240, which makes g3( ) the caller function and g2( ) the callee function at 1240. Function g4( ) includes a call to function g1 at 1260, which makes g4( ) the caller function and g1( ) the callee function at 1260. Function g5( ) includes a call to g2( ) at 1280, which makes g5( ) the caller function and g2( ) the callee function at 1280. Function g6( ) includes a call to g4( ) which makes g6( ) the caller function and g4( ) the callee function at 1292. Referring again to FIG. 13, function g7( ) includes a call to g1( ) at 1320, which makes g7( ) the caller function and g1( ) the callee function at 1320. Function g8( ) includes a call to function g2( ) at 1340, which makes g8( ) the caller function and g2( ) the callee function at 1340.

We now look at processing the code in FIGS. 12 and 13 using method 600 in FIG. 6. The code is scanned in step 610 until the function call at 1240 is found (step 620=YES). The callee function g2( ) is local (step 622=YES), and the caller function g3( ) uses TOC-based addressing, so it preserves the TOC pointer (step 640=YES). Because the callee function g2( ) uses TOC-based addressing, g2( ) has distinct global and local entry points (step 642=YES), so the compiler uses known methods (step 644), which can include, for example, adding an instruction such as 1710 shown in FIG. 17. Method 600 then loops back to step 610, where the program text is scanned until the function call at 1260 is found (step 620=YES). The caller function g4( ) uses TOC-based addressing, so it preserves the TOC pointer (step 640=YES). Because the callee function g1( ) uses PC-relative addressing, g1( ) does not have distinct global and local entry points (step 642=NO), so method 600 does processing for Case 1 (step 650). One suitable example for processing for Case 1 is shown as method 800 in FIG. 8. The callee function g1( ) uses PC-relative addressing, so it does not preserve the TOC pointer (step 810=NO). The compiler generates a save of the TOC pointer to a known stack location (step 830), then generates a call instruction that targets the callee (step 840). When the compiler is generating assembly code (step 850=YES), the compiler annotates the call using call-without-TOC relocation (step 860), such as using a R_PPC64_REL24_NOTOC relocation marker, as shown in instruction 1810 in FIG. 18. When the compiler is not generating assembly code (step 850=NO), the compiler resolves the address of the callee itself (step 870). The compiler then generates a restore of the TOC pointer from the known stack location (step 880). Method 800 is then done, which means processing for Case 1 in step 650 in FIG. 6 is done.

Method 600 then loops back to step 610 and scans the program text until the function call at 1280 in FIG. 12 is found (step 620=YES). The callee function g2( ) is local (step 622=YES). The caller function g5( ) uses TOC-based addressing, so it preserves the TOC pointer (step 640=YES). The callee function g2( ) has distinct global and local entry points (step 642=YES). The compiler then uses known methods (step 644). The known methods for step 644 could include, for example, the compiler generating a call instruction that directly addresses the callee's local entry point, using the R_PPC64_REL24 relocation marker, as shown in instruction 1910 in FIG. 19.

Method 600 then loops back to step 610 and continues scanning the program text until the function call at 1292 is found (step 620=YES). The callee function g4( ) is local (step 622=YES), and the caller function g1( ) uses TOC addressing, so it preserves the TOC pointer (step 640=YES). Because the callee function g4( ) is marked "static," the callee cannot be called from outside the compilation unit, so it does not require a distinct global entry point (step 642=NO), and processing for Case 1 is performed (step 650), one suitable example of which is shown as method 800 in FIG. 8. The callee uses TOC addressing, so it preserves the TOC pointer (step 810=YES). The compiler then uses known methods (step 820). Known methods in step 820 could include, for example, generating a call instruction that directly addresses the callee, using the R_PPC64_REL24 relocation marker, as shown in instruction 2010 in FIG. 20. Method 800 is done, which means processing for Case 1 in step 650 is done.

Method 600 then loops back to step 610 and continues scanning the program text until the function call at 1320 is found (step 620=YES). The callee function g1( ) is local (step 622=YES), and the caller function g7( ) uses PC-relative addressing, so it does not preserve the TOC pointer (step 640=NO). The callee function g1( ) does not require a TOC pointer because it uses PC-relative addressing (step 660=NO), so processing for Case 3 is performed (step 680), one suitable example of which is shown as method 900 in FIG. 9. The compiler generates the call instruction that targets the callee (step 910). When the compiler is generating assembly code (step 920=YES), the compiler annotates the call using call-without-TOC relocation (step 930), such as using a R_PPC64_REL24_NOTOC relocation marker, as shown at instruction 2110 in FIG. 21. When the compiler is not generating assembly code (step 920=NO), the compiler resolves the address of the callee itself (step 940). Method 900 is then done, which means processing for Case 3 in step 680 in FIG. 6 is done.

Method 600 then loops back to step 610, which continues scanning the program text until the function call at 1340 in FIG. 13 is found (step 620=YES). The callee function g2( ) is local (step 622=YES). The caller function g8( ) uses PC-relative addressing, and thus does not preserve the TOC pointer (step 640=NO). The callee function g2( ) uses TOC-based addressing, and thus requires the TOC pointer (step 660=YES). Processing for Case 4 is then performed (step 670), one suitable example of which is shown in method 1000 in FIG. 10. We assume for this example in FIGS. 12 and 13 the compiler is not relying on the linker to generate a PLT stub (step 1010=NO). The compiler generates inline code to store the callee's address in register r12 (step 1020). The compiler generates a call instruction without filling in the target address (step 1030). When the compiler is generating assembly code (step 1040=YES), the compiler annotates the call using call-without-TOC relocation (step 1050), such as using a R_PPC64_REL24_NOTOC relocation marker, as shown in instruction 2210 in FIG. 22. When the compiler is not generating assembly code (step 1040=NO), the compiler resolves the address of the callee function itself (step 1060). Method 1000 is then done, which means processing for Case 4 in step 670 in FIG. 6 is done. Method 600 loops back to step 610, which finds no more function calls, so step 620=NO, and method 600 is done.

FIGS. 14-22 show portions of the code generated for the functions in FIGS. 11-13. This is shown in assembly format, so addresses of called functions are always filled in by the assembler or linker, even in cases where the compiler knows how to resolve the address. This means for the examples in FIGS. 14-22, it is assumed the compiler is generating assembly code in steps 850, 920 and 1040.

FIG. 14 shows a portion of the code generated for function f2( ) such as in step 632 in FIG. 6. Note that f2( ) uses TOC addressing and therefore has separate local and global entry points. The compiler generates a "bl" (branch and link) instruction without filling in the target, and marks it with the R_PPC64_REL24 relocation for external function f1( ). The call is followed by a nop instruction to be overwritten by the linker with a TOC restore instruction if needed.

FIG. 15 shows a portion of the code generated for function D0, such as in steps 710 and 720 in FIG. 7. Note that f3( ) uses PC-relative addressing and therefore does not have separate local and global entry points. The compiler generates a "bl" instruction without filling in the target, and marks it with the R_PPC64_REL24_NOTOC relocation for external function f1( ). No nop instruction is generated in this case, as the TOC does not need to be restored.

FIG. 16 shows a portion of the code generated for functions g1( ) and g2( ). These functions contain no calls. Function g1( ) is a PC-relative function without separate local and global entry points. Function g2( ) uses TOC addressing and has separate local and global entry points.

FIG. 17 shows a portion of the code generated for function g3( ), such as in step 644 in FIG. 6. Note that g3( ) uses TOC addressing and therefore has separate local and global entry points. The compiler generates a "bl" instruction without filling in the target, and marks it with the R_PPC64_REL24 relocation for g2( )'s local entry point, shown as g2+8 in the FIG. 17. No nop instruction is generated in this case.

FIG. 18 shows a portion of the code generated for function g4( ), such as in steps 830-860 in FIG. 8. Note that g4( ) uses TOC addressing, but can only be called locally from other functions using TOC addressing, so it does not require separate local and global entry points. The generated code includes save and restore instructions for the TOC pointer around the generated "bl" instruction. The "bl" instruction is marked with the R_PPC64_REL24_NOTOC relocation for g1( ).

FIG. 19 shows a portion of the code generated for function g5( ), such as in step 644 in FIG. 6. Note that g5( ) uses TOC addressing, but can only be called locally from other functions using TOC addressing, so it does not require separate local and global entry points. The compiler generates a "bl" instruction without filling in the target, and marks it with the R_PPC64_REL24 relocation for g2( )'s local entry points, shown as g2+8 in FIG. 19. No nop instruction is generated for this case.

FIG. 20 shows a portion of the code generated for function g6( ), such as in step 820 in FIG. 8. Note that g6( ) uses TOC addressing and therefore has separate local and global entry points. The compiler generates a "bl" instruction without filling in the target, and marks it with the R_PPC64_REL24 relocation for function g4( ).

FIG. 21 shows a portion of the code generated for function g7( ), such as in steps 910-930 in FIG. 9. Note that g7( ) uses PC-relative addressing and therefore does not have separate local and global entry points. The compiler generates a "bl" instruction without filling in the target, and marks it with the R_PPC64_REL24_NOTOC relocation for function g1( ). No nop instruction is generated in this case, as the TOC does not need to be restored.

FIG. 22 shows a portion of the code generated for function g8( ), such as in steps 1020-1050 in FIG. 10. Note that g8( ) uses PC-relative addressing and therefore does not have separate local and global entry points. The compiler generates a "pla" instruction, which is capable of loading the entire 32-bit address of g2( ) into register r12. It then generates a "bl" instruction without filling in the target, and marks it with the R_PPC64_REL24_NOTOC relocation for g2( )'s global entry point. No nop instruction is generated in this case, as the TOC does not need to be restored.

Figure 23:
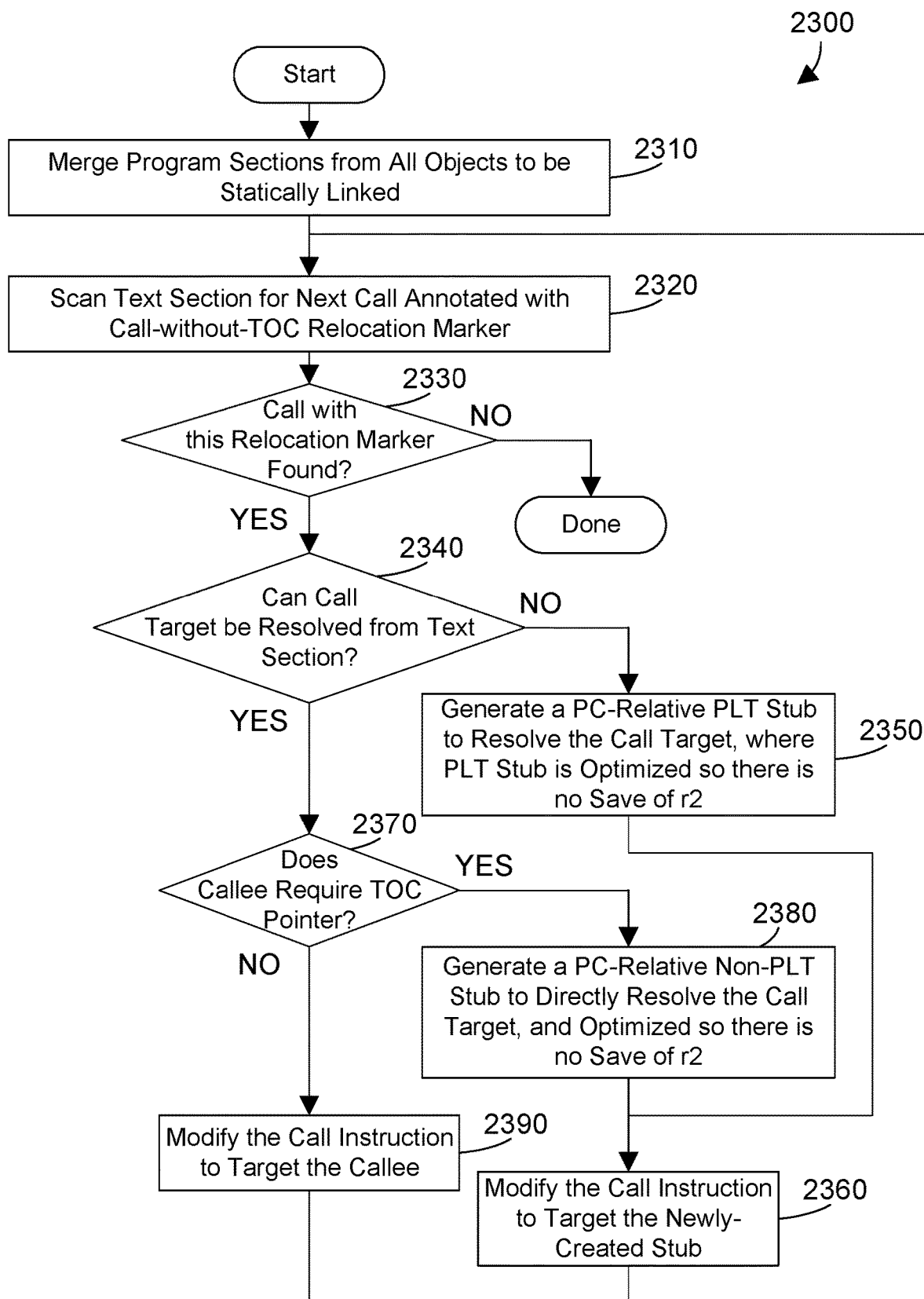
FIG. 23 is a flow diagram of a method for a linker to generate code for a computer program that includes multiple addressing modes.

The compiler 123 in FIG. 1 generates modules of code (as described in detail above) that next need to be linked together by linker 126. The linker 126 includes a function call instruction linker 128, which includes a multiple addressing mode resolver 129. Referring to FIG. 23, a method 2300 is preferably performed by the multiple addressing mode resolver 129 in linker 126. The program sections from all objects to be statically linked are merged (step 2310). The text is scanned for the next call annotated with a call-without-TOC relocation marker (step 2320). In the examples above, the call-without-TOC relocation marker is in the form of R_PPC64_REL24_NOTOC. When a call with this relocation marker is found (step 2330=YES), a determination is made of whether the call target can be resolved from the text section (step 2340). When the call target can be resolved from the text section (step 2340=YES), and when the callee does not require a TOC pointer (step 2370=NO), the call instruction is modified to target the callee (step 2390). When the call target cannot be resolved from the text section (step 2340=NO), the linker generates a PLT stub to resolve the call target, where the PLT stub is optimized so there is no save of r2, and where the function address is loaded from the procedure linkage table using a PC-relative addressing instruction (step 2350). The call instruction is then modified to target the newly-created PLT stub (step 2360). When the call target can be resolved from the text section (step 2340=YES), and when the callee requires a TOC pointer (step 2370=YES), the linker generates a stub to directly resolve the call target without using the procedure linkage table, optimized so there is no save of r2, and using a PC-relative addressing instruction to obtain the function address (step 2380). The call instruction is then modified to target the newly-created PLT stub (step 2360). Method 2300 then loops back to step 2320, and continues until there are no more calls with the call-without-TOC relocation marker (step 2330=NO), and method 2300 is done.

Figure 24:
FIG. 24 is a sample text portion of a computer program.

FIG. 24 shows disassembly of a section of code 2400 called .text that is a sample partially-linked executable program after step 2310 in FIG. 23 has been performed. The .text section contains program instructions, but not program data. The function <main> is shown at the 64-bit hexadecimal address 0000000010000480. The function <foo.notoc> is shown at the address 0000000010000800, and the function <foo_toc> is shown at the address 000000001001f240. We now refer to FIG. 23 in processing the sample code in FIG. 24. As stated above, we assume step 2310 has produced the .text shown in FIG. 24. This text section .text is then scanned for the next call annotated with the call-without-TOC relocation marker (step 2320). The first call-without-TOC relocation marker is shown at 2410 in FIG. 24 (step 2330=YES). Because this is a call to an external function foo_extern, the call target cannot be resolved from the text section (step 2340=NO), so the linker generates a PLT stub to resolve the call target, where the PLT stub is optimized so there is no save of r2, and where the function address is loaded from the procedure linkage table using a PC-relative addressing instruction (step 2350).

FIG. 25 shows a prior art PLT call stub 2500 that is used for TOC addressing. The stub is conventionally named plt_call.foo_extern, and is used to resolve the address of foo_extern. In this example, the stub is located at hexadecimal address 10020000. The first instruction 2510 in the stub is a store-doubleword instruction that saves the TOC pointer r2 in a reserved slot in the run-time stack. The second instruction 2520 is a load-doubleword instruction that loads into r12 the address to be called from a slot in the TOC, shown in FIG. 25 as addressed at an offset of −32416 from the TOC base pointer stored in r2. Initially the TOC slot contains the address of the dynamic linker's PLT resolver function, which will be called the first time the stub is executed. The resolver function finds the callee function at runtime, and updates the TOC slot to contain that address so that subsequent calls bypass the resolver. The resolver then calls the callee. The third instruction 2530 in the stub copies the function address into the count register, and the fourth instruction 2540 calls the function by branching to the address in the count register. Note this sequence places the function address in r12 so that the callee can initialize its TOC base pointer, if necessary.

FIG. 26 shows the revised PLT call stub 2600 that is generated by step 2350 in FIG. 23. Note the store-doubleword instruction to save the TOC pointer r2 at 2510 in FIG. 25 is not present, as the relocation specified that no TOC pointer is provided. The TOC-relative load-doubleword instruction is replaced by a PC-relative "prefixed load-doubleword" (pld) instruction 2610 that loads the address to be called from a global data location, here shown as addressed at an offset of 244312 from the instruction at hexadecimal address 10020000. The remainder of the stub 2600 that includes instructions 2530 and 2540 are the same instructions in FIG. 25.

Referring again to FIG. 23, following step 2350, the call instruction is then modified to target the newly created PLT stub (step 2360). FIG. 28 shows the result of linker actions on FIG. 24. The branch and link instruction 100004ec in FIG. 24 that included a call-without-TOC relocation marker 2410 has been replaced by a branch-and-link instruction at 2810 to the new PLT stub at instruction 10020000.

Method 2300 then loops back to step 2320 and scans for the next call annotated with the call-without-TOC relocation marker (step 2320). The next relocation marker at 2420 in FIG. 24 is found (step 2330=YES). The call is to foo_notoc, which is in this text section, so the call target can be resolved from the text section (step 2340=YES). The callee foo_notoc does not require a TOC pointer (step 2370=NO), so the call instruction is modified to target the callee (step 2390). The instruction 100005f4 that included a call-without-TOC relocation marker 2420 in FIG. 24 has been replaced by a branch-and-link instruction 2820 in FIG. 28 that jumps to instruction 10000800, the address of foo_notoc.

Method 2300 then loops back to step 2320 and scans for the next call annotated with the call-without-TOC relocation marker (step 2320). The next relocation marker at 2430 in FIG. 24 is found (step 2330=YES). The call is to foo_toc, which is in this text section, so the call target can be resolved from the text section (step 2340=YES). The callee foo_toc requires a TOC pointer (step 2370=YES), so the linker generates a stub to directly resolve the call target without using the procedure linkage table, optimized so there is no save of r2, and using a PC-relative addressing instruction to obtain the function address (step 2380).

FIG. 27 shows the call stub 2700 that is generated by step 2380. The stub is conventionally named non_plt_call_.foo_toc to distinguish it from stubs that resolve addresses using the procedure linkage table. Again the store-double-word instruction to save the TOC pointer r2 is not present, as the relocation specified that no TOC pointer is provided. The linker has determined statically that the address of the callee is foo_toc's global entry point, which requires its address to be set up in r12. This is accomplished using a "prefixed load-immediate" instruction 2710 that places the address 1001f240 directly into r12, rather than loading it either from a TOC slot or from another global data location. The remainder of the stub 2700 that includes instructions 2530 and 2540 are the same instructions in FIG. 25.

Following step 2380, the call instruction is then modified to target the newly created non-PLT stub (step 2360). The instruction 10000700 that included the call-without-TOC relocation marker 2430 in FIG. 24 has been replaced in FIG. 28 by a branch-and-link instruction 2830 that jumps to instruction 10020010, the new stub. Method 2300 then loops back to step 2320 and scans for the next call annotated with the call-without-TOC relocation marker (step 2320). No more such calls are to be found (step 2320=NO), so method 2300 is done.

The disclosure and claims herein support an apparatus comprising: An apparatus comprising: at least one processor; a memory coupled to the at least one processor; and a compiler residing in the memory and executed by the at least one processor, the compiler comprising: a multiple addressing mode resolver that generates code to resolve a plurality of function calls, wherein at least one of the plurality of function calls has a caller instruction that references a callee function, wherein the plurality of function calls includes a first function call that comprises code that uses a first addressing mode where a first address for first data is specified as an offset from a base pointer, where the base pointer is stored in a fixed processor register, wherein the plurality of function calls includes a second function call that comprises code that uses a relative addressing mode where a second address for second data is specified as an offset from an address of an instruction that references the second data, wherein the relative addressing mode does not preserve the base pointer stored in the fixed processor register.

The disclosure and claims herein further support an apparatus comprising: at least one processor; a memory coupled to the at least one processor; and a compiler residing in the memory and executed by the at least one processor, the compiler comprising: a multiple addressing mode resolver that generates code to resolve a plurality of function calls, wherein at least one of the plurality of function calls has a caller instruction that references a callee function, wherein the plurality of function calls includes a first function call that comprises code that uses a Table of Contents addressing mode where a first address for first data is specified as an offset from a base pointer to a Table of Contents, where the base pointer is stored in a fixed processor register, wherein the plurality of function calls includes a second function call that comprises code that uses a program counter-relative (PC-relative) addressing mode where a second address for second data is specified as an offset from an address of an instruction that references the second data, wherein the PC-relative addressing mode does not preserve the base pointer stored in the fixed processor register, wherein the multiple addressing mode resolver defines a plurality of cases that includes: a first case when a callee function is local, a caller function that calls the callee function preserves the base pointer and the callee function does not have distinct global and local entry points; a second case when the callee function is not local; a third case when the callee function is local, the caller function does not preserve the base pointer, and the callee function does not require the base pointer; and a fourth case when the callee function is local, the caller function does not preserve the base pointer, and the callee function requires the base pointer; wherein the processing for the first case comprises: when the callee function does not preserve the base pointer: generating a save of the base pointer to a known stack location; generating a call instruction that targets the callee function; when the compiler is generating assembly code, annotating the call instruction with a call-without-TOC relocation marker; when the compiler is not generating assembly code, resolving an address of the callee function; and generating a restore of the base pointer from the known stack location; wherein the processing for the second case comprises: generating a call instruction without filling in the target address; and annotating the call instruction with the call-without-TOC relocation marker; wherein the processing for the third case comprises: generating a call instruction that targets the callee function; when the compiler is generating assembly code, annotating the call instruction with the call-without-TOC relocation marker; and when the compiler is not generating assembly code, resolving an address of the callee function; wherein the processing for the fourth case comprises: when the compiler relies on a linker to generate stub code that provides run-time resolution of an address: generating inline code to store an address of the callee function into a defined processor register; generating a call instruction without filling in the target address; when the compiler is generating assembly code, annotating the call instruction with the call-without-TOC relocation marker; and when the compiler is not generating assembly code, resolving the address of the callee function.

The disclosure and claims herein additionally support a method for compiling a computer program, the method comprising: scanning text of a computer program for a plurality of function calls; and generating code to resolve the plurality of function calls, wherein at least one of the plurality of function calls has a caller instruction that references a callee function, wherein the plurality of function calls includes a first function call that comprises code that uses a first addressing mode where a first address for first data is specified as an offset from a base pointer, where the base pointer is stored in a fixed processor register, wherein the plurality of function calls includes a second function call that comprises code that uses a relative addressing mode where a second address for second data is specified as an offset from an address of an instruction that references the second data, wherein the relative addressing mode does not preserve the base pointer stored in the fixed processor register.

A compiler and linker include multiple addressing mode resolvers that generate code to resolve a plurality of function calls that use different addressing modes. A first addressing mode is defined where a first address for first data is specified as an offset from a base pointer. A second, relative addressing mode is defined where a second address for second data is specified as an offset from an address of an instruction that references the second data. The generated code assures correct operation when functions with different addressing modes are included in the computer program. The generated code includes code to preserve a base pointer when executing a function that uses relative addressing, when needed. The compiler inserts one or more relocation markers that trigger certain functions in the linker. A linker resolves the relocation markers inserted by the compiler, and generates code, when needed, that handles a mismatch between addressing modes.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor; and
   a compiler residing in the memory and executed by the at least one processor, the compiler comprising:
      a multiple addressing mode resolver that generates code to resolve a plurality of function calls, wherein at least one of the plurality of function calls has a caller instruction that references a callee function, wherein the plurality of function calls includes a first function call that comprises code that uses a first addressing mode where a first address for first data is specified as an offset from a base pointer, where the base pointer is stored in a fixed processor register, wherein the plurality of function calls includes a second function call that comprises code that uses a relative addressing mode where a second address for second data is specified as an offset from an address of an instruction that references the second data, wherein the relative addressing mode does not preserve the base pointer stored in the fixed processor register.

2. The apparatus of claim 1 wherein the multiple addressing mode resolver defines a plurality of cases that includes:
   a first case when a callee function is local, a caller function that calls the callee function preserves the base pointer and the callee function does not have distinct global and local entry points;
   a second case when the callee function is not local;
   a third case when the callee function is local, the caller function does not preserve the base pointer, and the callee function does not require the base pointer; and
   a fourth case when the callee function is local, the caller function does not preserve the base pointer, and the callee function requires the base pointer.

3. The apparatus of claim 2 wherein the processing for the first case comprises:
   when the callee function does not preserve the base pointer:
      generating a save of the base pointer to a known stack location;
      generating a call instruction that targets the callee function;
      when the compiler is generating assembly code, annotating the call instruction with a call-without-Table Of Contents (TOC) relocation marker;
      when the compiler is not generating assembly code, resolving an address of the callee function; and
      generating a restore of the base pointer from the known stack location.

4. The apparatus of claim 2 wherein the processing for the second case comprises:
   generating a call instruction without filling in the target address; and
   annotating the call instruction with a call-without-Table Of Contents (TOC) relocation marker.

5. The apparatus of claim 2 wherein the processing for the third case comprises:
   generating a call instruction that targets the callee function;
   when the compiler is generating assembly code, annotating the call instruction with a relocation marker; and
   when the compiler is not generating assembly code, resolving an address of the callee function.

6. The apparatus of claim 2 wherein the processing for the fourth case comprises:
   when the compiler relies on a linker to generate stub code that provides run-time resolution of an address:
      generating inline code to store an address of the callee function into a defined processor register;
      generating a call instruction without filling in the target address;
      when the compiler is generating assembly code, annotating the call instruction with a call-without-Table Of Contents (TOC) relocation marker; and
      when the compiler is not generating assembly code, resolving the address of the callee function.

7. The apparatus of claim 1 wherein the first addressing mode comprises a table of contents-based addressing mode, wherein the base pointer is a pointer to a base address of the table of contents.

8. The apparatus of claim 1 wherein the relative addressing mode comprises a program counter (PC)-relative addressing mode.

9. An apparatus comprising:
   at least one processor;

a memory coupled to the at least one processor; and
a compiler residing in the memory and executed by the at least one processor, the compiler comprising:
  a multiple addressing mode resolver that generates code to resolve a plurality of function calls, wherein at least one of the plurality of function calls has a caller instruction that references a callee function, wherein the plurality of function calls includes a first function call that comprises code that uses a Table of Contents addressing mode where a first address for first data is specified as an offset from a base pointer to a Table of Contents, where the base pointer is stored in a fixed processor register, wherein the plurality of function calls includes a second function call that comprises code that uses a program counter-relative (PC-relative) addressing mode where a second address for second data is specified as an offset from an address of an instruction that references the second data, wherein the PC-relative addressing mode does not preserve the base pointer stored in the fixed processor register, wherein the multiple addressing mode resolver defines a plurality of cases that includes:
    a first case when a callee function is local, a caller function that calls the callee function preserves the base pointer and the callee function does not have distinct global and local entry points;
    a second case when the callee function is not local;
    a third case when the callee function is local, the caller function does not preserve the base pointer, and the callee function does not require the base pointer; and
    a fourth case when the callee function is local, the caller function does not preserve the base pointer, and the callee function requires the base pointer;
  wherein the processing for the first case comprises:
    when the callee function does not preserve the base pointer:
      generating a save of the base pointer to a known stack location;
      generating a call instruction that targets the callee function;
      when the compiler is generating assembly code, annotating the call instruction with a call-without-Table Of Contents (TOC) relocation marker;
      when the compiler is not generating assembly code, resolving an address of the callee function; and
      generating a restore of the base pointer from the known stack location;
  wherein the processing for the second case comprises:
    generating a call instruction without filling in the target address; and
    annotating the call instruction with the call-without-TOC relocation marker;
  wherein the processing for the third case comprises:
    generating a call instruction that targets the callee function;
    when the compiler is generating assembly code, annotating the call instruction with the call-without-TOC relocation marker; and
    when the compiler is not generating assembly code, resolving an address of the callee function;
  wherein the processing for the fourth case comprises:
    when the compiler relies on a linker to generate stub code that provides run-time resolution of an address:
      generating inline code to store an address of the callee function into a defined processor register;
      generating a call instruction without filling in the target address;
      when the compiler is generating assembly code, annotating the call instruction with the call-without-TOC relocation marker; and
      when the compiler is not generating assembly code, resolving the address of the callee function.

10. A method for compiling a computer program, the method comprising:
  scanning text of a computer program for a plurality of function calls; and
  generating code to resolve the plurality of function calls, wherein at least one of the plurality of function calls has a caller instruction that references a callee function, wherein the plurality of function calls includes a first function call that comprises code that uses a first addressing mode where a first address for first data is specified as an offset from a base pointer, where the base pointer is stored in a fixed processor register, wherein the plurality of function calls includes a second function call that comprises code that uses a relative addressing mode where a second address for second data is specified as an offset from an address of an instruction that references the second data, wherein the relative addressing mode does not preserve the base pointer stored in the fixed processor register.

11. The method of claim 10 wherein the multiple addressing mode resolver defines a plurality of cases that includes:
  a first case when a callee function is local, a caller function that calls the callee function preserves the base pointer and the callee function does not have distinct global and local entry points;
  a second case when the callee function is not local;
  a third case when the callee function is local, the caller function does not preserve the base pointer, and the callee function does not require the base pointer; and
  a fourth case when the callee function is local, the caller function does not preserve the base pointer, and the callee function requires the base pointer.

12. The method of claim 11 wherein the processing for the first case comprises:
  when the callee function does not preserve the base pointer:
    generating a save of the base pointer to a known stack location;
    generating a call instruction that targets the callee function;
    when the compiler is generating assembly code, annotating the call instruction with a call-without-Table Of Contents (TOC) relocation marker;
    when the compiler is not generating assembly code, resolving an address of the callee function; and
    generating a restore of the base pointer from the known stack location.

13. The method of claim 11 wherein the processing for the second case comprises:
  generating a call instruction without filling in the target address; and
  annotating the call instruction with a call-without-Table Of Contents (TOC) relocation marker.

14. The method of claim 11 wherein the processing for the third case comprises:
  generating a call instruction that targets the callee function;
  when the compiler is generating assembly code, annotating the call instruction with a call-without-Table Of Contents (TOC) relocation marker; and when the compiler is not generating assembly code, resolving an address of the callee function.

15. The method of claim 11 wherein the processing for the fourth case comprises:
when the compiler relies on a linker to generate stub code that provides run-time resolution of an address:
generating inline code to store an address of the callee function into a defined processor register;
generating a call instruction without filling in the target address;
when the compiler is generating assembly code, annotating the call instruction with a call-without-Table Of Contents (TOC) relocation marker; and
when the compiler is not generating assembly code, resolving the address of the callee function.

16. The method of claim 10 wherein the first addressing mode comprises a table of contents-based addressing mode, wherein the base pointer is a pointer to a base address of the table of contents.

17. The method of claim 10 wherein the relative addressing mode comprises a program counter (PC)-relative addressing mode.

* * * * *